US012718450B2

(12) United States Patent
Guay et al.

(10) Patent No.: US 12,718,450 B2
(45) Date of Patent: Aug. 25, 2026

(54) REDUCING DOMAIN SHIFT IN NEURAL MOTION CONTROLLERS

(71) Applicants: DISNEY ENTERPRISES, INC., Burbank, CA (US); ETH Zürich (Eidgenössische Technische Hochschule Zürich), Zürich (CH)

(72) Inventors: Martin Guay, Zurich (CH); Dhruv Agrawal, Zurich (CH); Dominik Tobias Borer, Zurich (CH); Jakob Joachim Buhmann, Zurich (CH); Mattia Gustavo Bruno Paolo Ryffel, Bidogno (CH); Robert Walker Sumner, Zurich (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 514 days.

(21) Appl. No.: 18/172,239

(22) Filed: Feb. 21, 2023

(65) Prior Publication Data

US 2024/0282028 A1 Aug. 22, 2024

(51) Int. Cl.
*G06T 13/00* (2011.01)
*G06T 7/246* (2017.01)
*G06T 7/73* (2017.01)

(52) U.S. Cl.
CPC .............. *G06T 13/00* (2013.01); *G06T 7/248* (2017.01); *G06T 7/74* (2017.01);
(Continued)

(58) Field of Classification Search
CPC ........... G06T 13/00; G06T 2207/10016; G06T 2207/20081; G06T 2207/20084;
(Continued)

(56) References Cited

U.S. PATENT DOCUMENTS 11,017,560 B1 * 5/2021 Gafni ........................ G06N 3/08
2023/0123820 A1 * 4/2023 Wang ..................... G06N 3/088 345/474

(Continued)

FOREIGN PATENT DOCUMENTS

CN 117421589 A 1/2024

OTHER PUBLICATIONS

Clavet et al., "Motion Matching—The Road to Next Gen Animation", GDC Vault, Retrieved from https://www.gdcvault.com/play/1022985/Motion-Matching-and-The-Road, Mar. 16-18, 2016, 107 pages.

(Continued)

*Primary Examiner* — Phi Hoang
(74) *Attorney, Agent, or Firm* — Squire Patton Boggs LLP; Sarah Mirza

(57) ABSTRACT

One embodiment of the present invention sets forth a technique for training a neural motion controller. The technique includes determining a first set of features associated with a first control signal for a virtual character. The technique also includes matching the first set of features to a first sequence of motions included in a plurality of sequences of motions. The technique further includes training the neural motion controller based on one or more motions included in the first sequence of motions and the first control signal.

17 Claims, 5 Drawing Sheets

(52) U.S. Cl.
CPC ............... *G06T 2207/10016* (2013.01); *G06T 2207/20081* (2013.01); *G06T 2207/20084* (2013.01); *G06T 2207/30196* (2013.01)

(58) Field of Classification Search
CPC . G06T 7/248; G06T 7/74; G06T 2207/30196; G06T 13/40; G06N 3/02
See application file for complete search history.

(56) References Cited

U.S. PATENT DOCUMENTS

| | | | | |
|---|---|---|---|---|
| 2023/0254448 | A1* | 8/2023 | Binder | G10L 15/25 348/14.08 |
| 2023/0302357 | A1* | 9/2023 | Doken | A63F 13/812 |
| 2024/0078841 | A1* | 3/2024 | Sekar | G06V 10/82 |
| 2024/0354581 | A1* | 10/2024 | Zinno | G06N 3/092 |

OTHER PUBLICATIONS

Holden et al., "Phase-Functioned Neural Networks for Character Control", ACM Transactions on Graphics, vol. 36, No. 4, Article 42, DOI: 10.1145/3072959.3073663, Jul. 2017, pp. 42:1-42:13.

Starke et al., "Neural State Machine for Character-Scene Interactions", ACM Transactions on Graphics, vol. 38, No. 6, Article 178, DOI: 10.1145/3355089.3356505, Nov. 2019, pp. 178:1-178:14.

Holden et al., "Learned Motion Matching", ACM Transactions on Graphics, vol. 39, No. 4, Article 53, DOI: 10.1145/3386569.3392440, Jul. 2020, pp. 53:1-53:13.

GB Combined Search and Examination Report received for Application No. GB2402487.9 dated Dec. 4, 2024.

Holden et al., "Phase-Functioned Neural Networks for Character Control", ACM Transactions on Graphics, vol. 36, No. 4, Jul. 2017, 13 pages.

Wang et al., "UniCon: Universal Neural Controller For Physics-based Character Motion", retrieved from https://research.nvidia.com/labs/torontoai/unicon/resources/main.pdf , Nov. 28, 2020, pp. 1-15.

Canadian Office Action received for Application No. 3229740 dated Feb. 28, 2025, 5 pages.

First Examination Report received for Australian Application No. 808386 dated Sep. 15, 2025, 4 pages.

Office Action received for Canadian Application No. 3,229,740 dated Dec. 11, 2025, 4 pages.

First Examiner's Report received for Australian Application No. 2024201102, dated Jun. 30, 2025, 3 pages.

* cited by examiner

REDUCING DOMAIN SHIFT IN NEURAL MOTION CONTROLLERS

BACKGROUND

Field of the Various Embodiments

Embodiments of the present disclosure relate generally to machine learning and neural motion controllers and, more specifically, to techniques for reducing domain shift in neural motion controllers.

Description of the Related Art

Neural motion controllers are neural networks that can be used to animate virtual characters in real-time, given input signals for controlling the movements of the virtual characters. For example, a neural motion controller can include a deep learning model that generates a sequence of poses (i.e., positions and orientations) used to animate a virtual character. The resulting animation can then be used in a game, a previsualization of a film or television show, or another application involving the virtual character.

A neural motion controller can be trained using training input data that is generated from motion capture data. For example, training input data for the neural motion controller could include a "root trajectory" that is computed based on positions associated with the hips of the virtual character. Given this root trajectory, the neural motion controller would be trained to output poses for the virtual character that cause the virtual character to follow the root trajectory.

However, during inference, input data into the trained neural motion controller is commonly derived from a control signal generated by an input device, which differs from the training input data previously used to train the neural motion controller. Continuing with the above example, the trained neural motion controller could be executed to predict the motion of a virtual character, given a root trajectory that is generated based on a control signal provided via a gamepad, joystick, keyboard, mouse, touchpad, and/or another type of input device. Because this type of root trajectory differs from the root trajectories with which the neural motion controller was trained, the trained neural motion controller is unable to fully generalize to the distribution of input root trajectories generated from input device control signals. Consequently, the neural motion controller can produce erroneous outputs such as floating limbs, foot "sliding," or other artifacts that negatively impact the quality of the resulting motion or animation.

As the foregoing illustrates, what is needed in the art are more effective techniques for animating virtual characters using neural motion controllers.

SUMMARY

One embodiment of the present invention sets forth a technique for training a neural motion controller. The technique includes determining a first set of features associated with a first control signal for a virtual character. The technique also includes matching the first set of features to a first sequence of motions included in a plurality of sequences of motions. The technique further includes training the neural motion controller based on one or more motions included in the first sequence of motions and the first control signal.

One technical advantage of the disclosed techniques relative to the prior art is that the neural motion controller is able to generalize to input data that is derived from input device control signals. Consequently, the neural motion controller can generate output motions with fewer artifacts and errors than conventional neural motion controllers that process different types of input data during training and inference. Another technical advantage of the disclosed techniques is that the disclosed techniques can be used to train and execute any type of neural motion controller. Accordingly, the disclosed techniques can be adapted to a variety of neural motion controller architectures, characteristics, and use cases. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
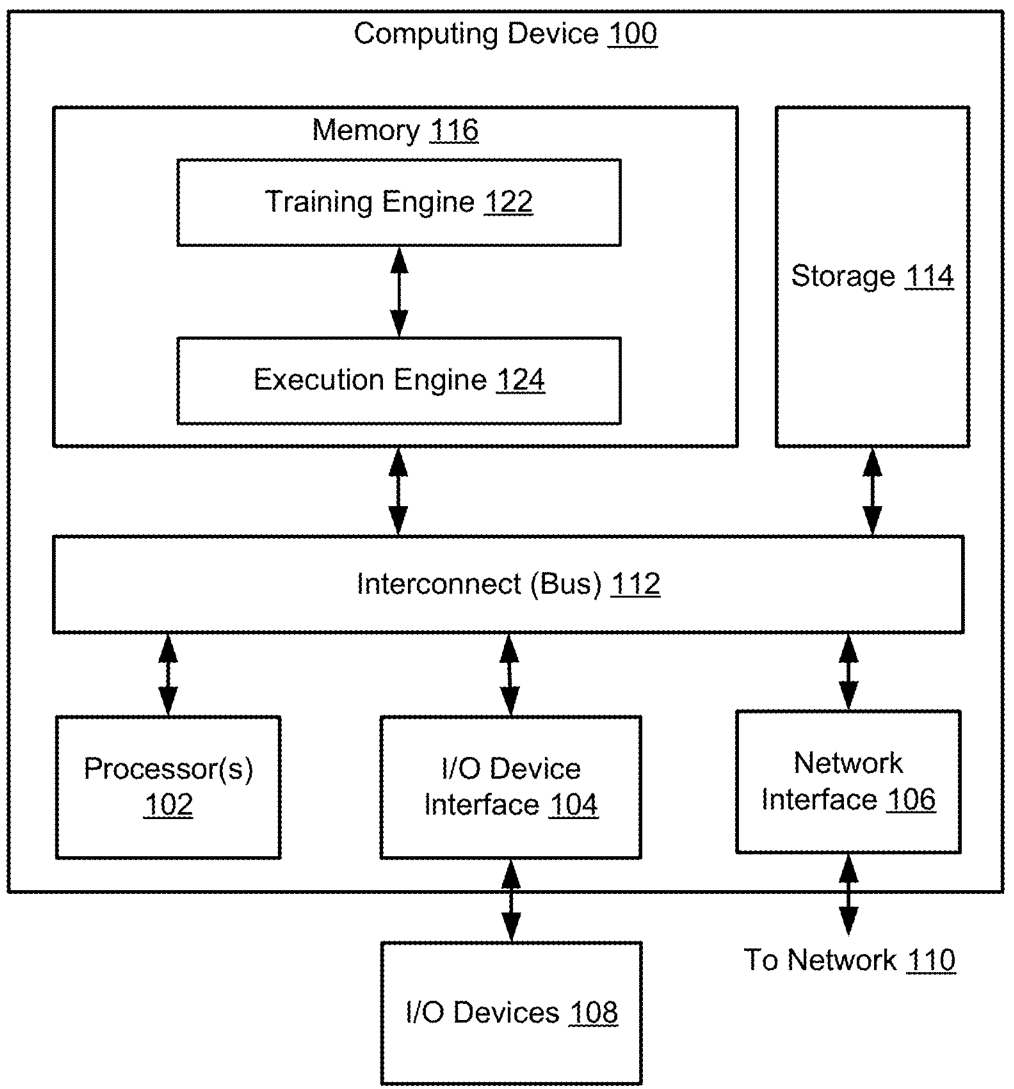
FIG. 1 illustrates a computing device configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains a machine learning model to perform motion control of a virtual character. More specifically, the machine learning model includes a neural motion controller that outputs various sequences of poses used to animate the virtual character. Each of the outputted poses corresponds to a "next pose" for the virtual character and is generated based on one or more previous poses for the virtual character and a control signal that specifies the direction, speed, and/or other attributes associated with the motion of the virtual character. As described in further detail below, training engine 122 trains the machine learning model to perform motion control based on relationships between control signals and sequences of poses that adhere to the control signals.

Execution engine 124 executes one or more portions of the trained machine learning model to convert additional control signals into corresponding sequences of poses used to animate the virtual character. Because the machine learning model is trained and executed using the same type of control signal, the machine learning model is able to generate character motions more accurately and/or with fewer artifacts than conventional neural motion controllers that are trained and executed using different distributions of input data.

Reducing Domain Shift in Neural Motion Controllers

Figure 2:
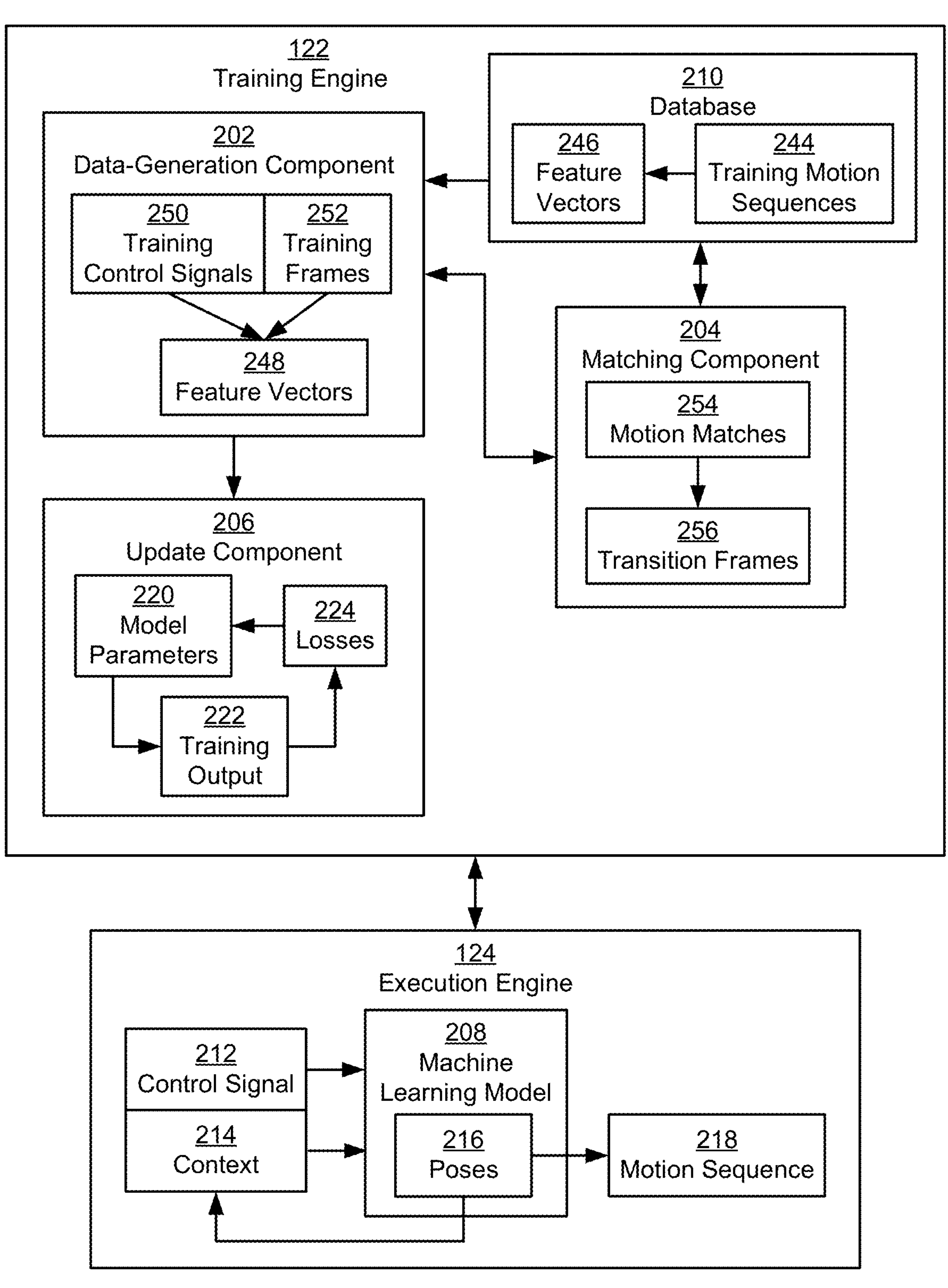
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a machine learning model 208 to control the motion of a virtual character. For example, training engine 122 and execution engine 124 could use machine learning model 208 to generate a motion sequence 218 for a human, animal, robot, and/or another type of articulated object corresponding to the virtual character.

Motion sequence 218 includes a sequence of discrete poses 216 (i.e., positions and orientations) that is used to convey motion in the virtual character. For example, motion sequence 218 could include a sequence of two-dimensional (2D) and/or three-dimensional (3D) joint positions, joint rotations, or other representations of joints in the articulated object. Each pose in motion sequence 218 could correspond to a different frame, or time step, of motion in the articulated object. As poses 216 are generated by machine learning model 208, poses 216 could be used to update the corresponding joints in a visual representation of the articulated object, thereby generating an animation of the virtual character.

As shown in FIG. 2, input into machine leaning model 208 includes a control signal 212 for the virtual character. In some embodiments, control signal 212 includes data that specifies a direction in which the virtual character faces, a velocity of the virtual character, a trajectory associated with the virtual character, a motion or action performed by the virtual character (e.g., waving, smiling, kicking, dancing, etc.), and/or another attribute that characterizes the expected motion of the virtual character. For example, control signal 212 could include one or more commands provided by a gamepad controller, keyboard, mouse, joystick, touchpad, and/or another type of input device. In another example, control signal 212 could include a sparse motion capture signal associated with a limited set of markers worn by a user. In a third example, control signal 212 could be generated by a tracking device included in an augmented reality (AR), virtual reality (VR), and/or mixed reality (MR) system.

Input into machine learning model 208 also includes a context 214 associated with a given time step of motion for the virtual character. In one or more embodiments, context 214 includes data associated with one or more previous poses 216 generated by machine learning model 208. For example, context 214 for a given time step of motion could include a certain number of poses 216 generated by machine learning model 208 for a corresponding number of previous time steps of motion for the virtual character. Context 214 can also, or instead, include data related to terrain, objects, obstacles, structures, other characters, or other components of the environment within which the virtual character is animated.

Given control signal 212 and context 214 for a given time step of motion, machine learning model 208 generates a pose that represents the motion of the virtual character for that time step. For example, machine learning model 208 could output a new pose for a current time step by combining a direction, velocity, trajectory, action, or another attribute specified within a temporal "window" of data of control signal 212 with one or more previous poses 216 and/or one or more trajectories associated with previous poses 216 in context 214. The new pose would include updates to the positions of joints in the virtual character that cause the virtual character to move in a way that adheres to the attribute(s) specified in the window of data from control signal 212.

Figure 3:
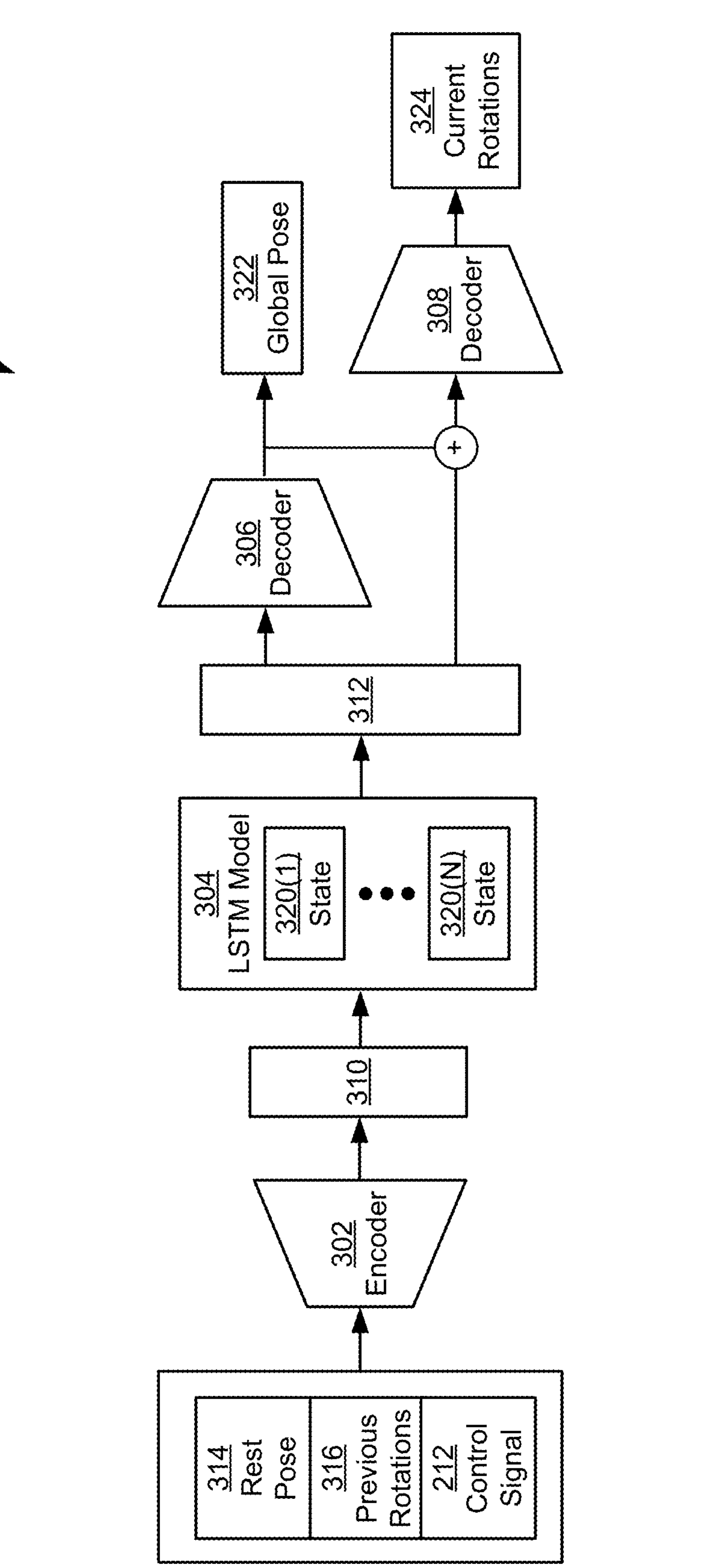
FIG. 3 illustrates an example architecture for the machine learning model of FIG. 2, according to various embodiments.

FIG. 3 illustrates an example architecture for machine learning model 208 of FIG. 2, according to various embodiments. As shown in FIG. 3, machine learning model 208 includes an encoder 302, a long short-term memory (LSTM) model 304, and two decoders 306-308. Each of these components is described in further detail below.

Input into encoder 302 includes a rest pose 314 associated with a virtual character, a set of previous rotations 316 associated with rest pose 314, and control signal 212. Rest pose 314 includes a "default" set of position for joints in the virtual character. For example, rest pose 314 could include a T-pose for a human or humanoid character. In another example, rest pose 314 could include a default arrangement of joints in an animal, non-humanoid robot, and/or another type of non-humanoid character.

Previous rotations 316 include transformations that are applied to rest pose 314 to generate one or more previous poses for the virtual character. For example, each set of previous rotations 316 could be applied to joint positions in rest pose 314 to generate a corresponding previous pose for the virtual character. Each set of previous rotations 316 could also be generated by machine learning model 208 for a previous time step of motion for the virtual character.

As mentioned above, control signal 212 includes one or more attributes that specify the expected motion or animation of the virtual character. For example, control signal 212 could include an x- and/or y-coordinate of a joystick, a command associated with strafing of the virtual character, one or more actions to be performed by the virtual character, and/or other types of data received from an input device. In another example, control signal 212 could include sparse motion capture data and/or tracking data associated with the real-world movement of a person, animal, robot, or another type of articulated object. In both examples, control signal 212 for a given time step could span a temporal window that leads up to and/or includes the time step.

Encoder 302 converts rest pose 314, previous rotations 316, and control signal 212 into a latent vector 310. For example, encoder could include a set of linear neural network layers that encode rest pose 314, previous rotations 316, and control signal 212 into a higher-dimensional vector 310.

Vector 310 is inputted into and further processed by LSTM model 304. More specifically, LSTM model 304 generates a current state 312 associated with the current time step based on vector 310 and one or more previous states 320(1)-320(N) (each of which is referred to individually herein as state 320) associated with one or more previous time steps. For example, LSTM model 304 could include an autoregressive model that generates current state 312, given one or more previous states 320 generated by LSTM model 304 and/or one or more previous control signals used to generate the previous state(s) 320.

Decoder 306 converts current state 312 into a global pose 322 associated with the current frame of animation for the virtual character. For example, decoder 306 could generate a global 3D position and/or 3D orientation for a representative point on the virtual character based on current state 312.

Global pose 322 is combined (e.g., summed, concatenated, etc.) with current state 312 to generate input into decoder 308. In response to the input, decoder 308 generates a set of current rotations 324 that can be applied to rest pose 314 to produce a pose for the current time step. After current rotations 324 are generated, the time step is incremented, previous rotations 316 are updated to include current rotations 324, and the process is repeated using rest pose 314, a new control signal 212, and the updated set of previous rotations 316.

While machine learning model 208 has been described above with respect to the architecture of FIG. 3, it will be appreciated that machine learning model 208 can be implemented using other types of architectures or techniques that are suitable for use with neural motion controllers. For example, machine learning model 208 could include a mixture of experts model that includes multiple expert models, where each expert model is specialized in a subtask related to motion control of a virtual character. The mixture of experts model also uses a set of experts weights and an activation function to combine multiple outputs from the expert models into a final pose for a given time step. In another example, machine learning model 208 could include a variational autoencoder and/or another type of probabilistic model that describes a range or distribution of possible motions for a virtual character, given input that includes control signal 212 and/or context 214 associated with prior poses 216 for the virtual character. In a third example, machine learning model 208 could include (but is not limited to) one or more convolutional neural networks, transformer neural networks, generative adversarial networks, bidirectional attention models, support vector machines, regression models, tree-based models, cluster-based models, hierarchical models, and/or other types of machine learning models or structures.

Returning to the discussion of FIG. 2, training engine 122 trains machine learning model 208 using training data that includes a set of training control signals 250 and a database 210 of training motion sequences 244. Like control signal 212, training control signals 250 include data that can be used to describe or control the motion of a virtual character. For example, training control signals 250 could include sequences of user-generated and/or synthesized indications of the direction in which the virtual character should point, the trajectory of the virtual character, the velocity of the virtual character, one or more actions to be performed by the virtual character, and/or other attributes related to the motion of the virtual character.

Training motion sequences 244 include sequences of poses that represent various types of motion for the virtual character. For example, each of training motion sequences 244 could include a sequence of 2D and/or 3D positions, rotations, and/or other representations of the joints of a human, animal, robot, or another type of articulated object. Each pose within a given training motion sequence could represent a different frame, or time step, of motion in the corresponding articulated object.

In some embodiments, each of training motion sequences 244 corresponds to a motion capture sequence that is generated via a motion capture technique. For example, each training motion sequence in training motion sequences 244 could depict a person, animal, robot, or another type of articulated object walking, jogging, running, turning, spinning, dancing, strafing, waving, climbing, descending, crouching, hopping, jumping, dodging, skipping, interacting with an object, and/or engaging in another type of motion or action, a combination of motions or actions, or a sequence of motions or actions. Multiple training motion sequences 244 collected by the motion capture technique can be stored in a key-value store and/or another type of database 210 for subsequent retrieval and use.

As shown in FIG. 2, training engine 122 includes a data-generation component 202, a matching component 204, and an update component 206. Data-generation component 202 and matching component 204 interoperate to generate motion matches 254 between portions of training control signals 250 and portions of training motion sequences 244. Each of motion matches 254 identifies one or more frames in training motion sequences 244 that best represent one or more motions specified in a portion of a training control signal.

More specifically, data-generation component 202 generates feature vectors 248 representing different portions of training control signals 250, starting with the beginning of each training control signal and progressing until the end of the training control signal is reached and/or another condition is met. For example, data-generation component 202 could generate a sequence of feature vectors 248 corresponding to a sequence of contiguous temporal "chunks" within a given training control signal. While processing a given training control signal, data-generation component 202 could generate a new feature vector for a new chunk of the training control signal after a certain number of frames or time steps has passed since the feature vector for the previous chunk of the training control signal was generated. Data-generation component 202 could also, or instead, generate a new feature vector after detecting a significant change in the training control signal (e.g., when the magnitude of one or more components of the training control signal exceeds a threshold).

Each of feature vectors 248 includes a set of features that characterize the motion associated with a temporal window spanned by a corresponding portion of a training control signal. For example, each feature vector in feature vectors 248 could include one or more positions, trajectories, velocities, and/or other attributes that describe the future motion of the virtual character, given the portion of the training control signal within the window. These attributes could be obtained from values of the training control signal within the window and/or derived from values of the training control signal within the window.

Training motion sequences 244 in database 210 are also associated with feature vectors 246. Each of feature vectors 246 includes a set of features that characterize the motion associated with a corresponding frame or timestep in a training motion sequence. For example, each feature vector in feature vectors 246 could include one or more positions, trajectories, velocities, and/or other attributes associated with a virtual character at a specific frame or timestep within a training motion sequence. Attributes in feature vectors 246 could be generated by data-generation component 202 from the corresponding frames in training motion sequences 244. Mappings between feature vectors 246 and the corresponding frames in training motion sequences 244 could also be stored in database 210 to allow the frames to be indexed and/or retrieved using the corresponding feature vectors 246.

In some embodiments, feature vectors 246 include attributes that can be compared with attributes in feature vectors 248 generated from training control signals 250 and training frames 252. For example, both feature vectors 246 and feature vectors 248 could include one-hot encodings, numeric values, embeddings, and/or other representations of the same motion-based attributes. As a result, cosine similarities, Euclidean distances, dot products, and/or other measures of vector similarity or distance could be used with pairs of vectors selected from feature vectors 246 and feature vectors 248 to characterize the similarity or dissimilarity between each pair of vectors.

For each feature vector (e.g., in feature vectors 248) generated by data-generation component 202 from a corresponding portion of a training control signal, matching component 204 generates one or more motion matches 254 between that portion of the training control signal and one or more frames in training motion sequences 244 based on similarities between the feature vector and feature vectors 246 for the frames in training motion sequences 244. For example, matching component 204 could use a nearest neighbor search and/or another search technique to match a given feature vector (e.g., in feature vectors 248) generated by data-generation component 202 for a portion of a training control signal to the closest or most similar feature vector (e.g., in feature vectors 246) for a frame in training motion sequences 244. The search technique could be accelerated by storing feature vectors 246 in a KD-tree and/or another type of data structure that recursively partitions a multidimensional space and subsequently traversing the data structure based on the feature vector for the portion of the training control signal.

Figure 4:
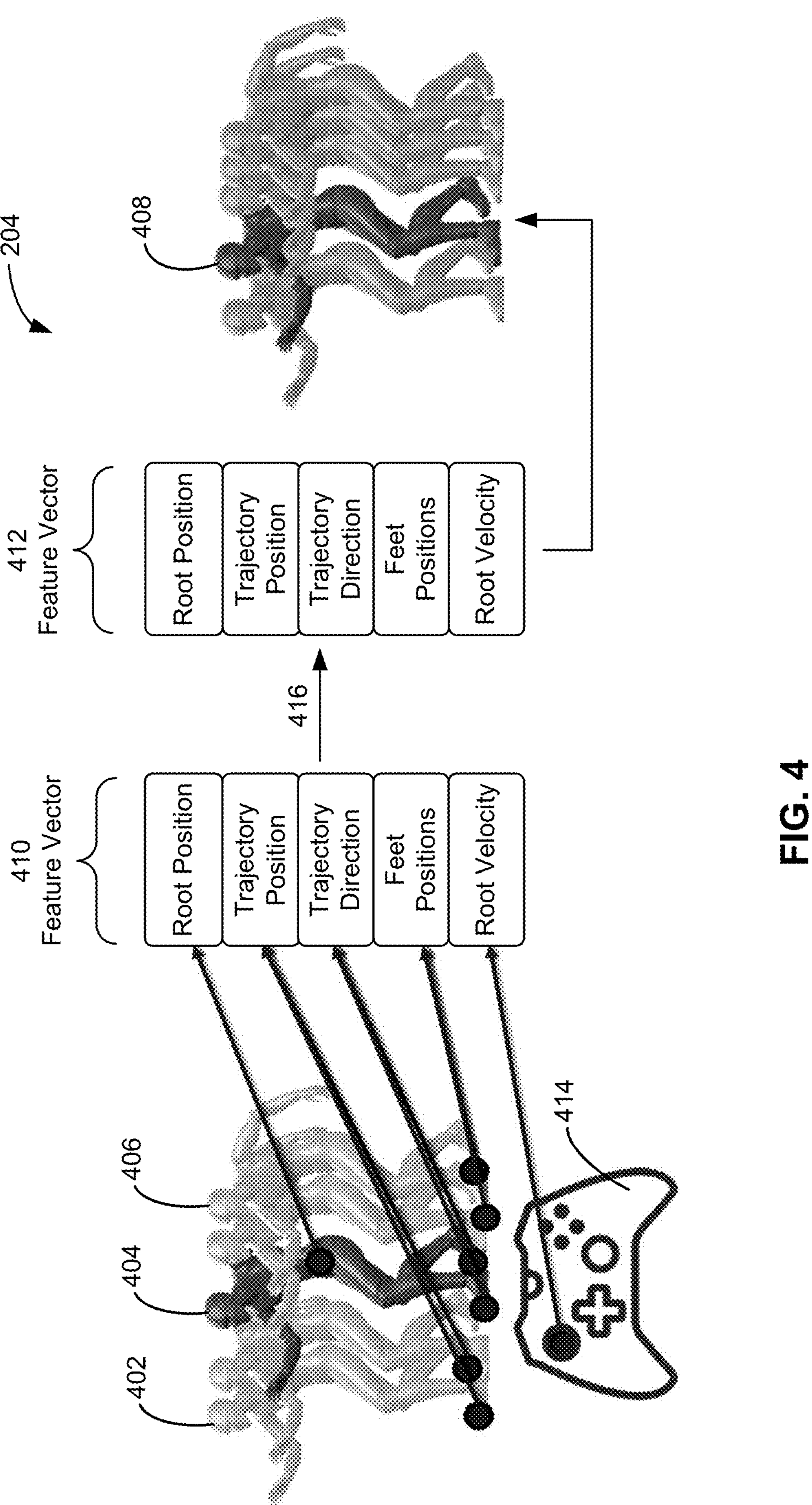
FIG. 4 illustrates how the matching component of FIG. 2 generates a match between a feature vector for a set of frames associated with a control signal and a frame included in a motion sequence, according to various embodiments.

FIG. 4 illustrates how matching component 204 of FIG. 2 generates a match 416 (e.g., one of motion matches 254) between a feature vector 410 for a set of frames 402, 404, and 406 associated with a control signal 414 (e.g., one of training control signals 250) and a frame 408 included in a motion sequence (e.g., one of training motion sequences 244), according to various embodiments.

In one or more embodiments, frames 402, 404, and 406 correspond to time steps that occur after a current frame for which match 416 is made. For example, frames 402, 404, and 406 could correspond to the $20^{th}$, $40^{th}$, and $60^{th}$ frames after the current frame within an animation that is played at 60 frames per second. In general, the number of frames used to generate feature vector 410 and/or the future time steps represented by the frames can be varied to accommodate requirements or preferences related to the sensitivity or responsiveness of the animation to control signal 414, the continuity of motion associated with the animation, and/or other factors.

As shown in FIG. 4, matching component 204 populates feature vector 410 with attributes that are derived from control signal 414 and frames 402, 404, and 406. More specifically, feature vector 410 includes a root velocity that is determined using control signal 414. For example, matching component 204 could compute the root velocity based on a position or state of a joystick and/or another input device within a temporal window leading up to and/or around the current frame.

Feature vector 410 also includes a root position, a trajectory position, a trajectory direction, and one or more feet positions associated with frames 402, 404, and 406. The root position in each frame 402, 404, and 406 can be determined from the position of the hips of the virtual character within that frame. For example, the root position could be computed by projecting one or more points associated with the hips of the virtual character onto the ground. Similarly, the feet positions in each frame 402, 404, and 406 correspond to the positions of the feet of the virtual character within that frame.

The trajectory position for each frame 402, 404, and 406 can be determined as a projection of a future root position of the virtual character onto the ground, given the root velocity derived from control signal 414 and the current root position and/or pose of the virtual character. Similarly, the trajectory direction for each frame 402, 404, and 406 can be determined as a projection of a future direction in which the virtual character will head, given the root velocity derived from control signal 414 and the current root position and/or pose of the virtual character. For example, the trajectory position associated with each frame 402, 404, and 406 could be generated as a future root position of the virtual character, as determined by a spring-dampening-based system based on control signal 414. The trajectory direction associated with each frame 402, 404, and 406 could be generated as a vector extending from the corresponding trajectory position for that frame. The vector could indicate the direction in which the virtual character is heading during that frame and could also be generated by spring-dampening-based system based on control signal 414.

In general, the number and/or types of attributes included in feature vector 410 can be selected to reflect the types of motions or behaviors used to generate match 416. For example, feature vector 410 could include accelerations, feet velocities, root velocities, positions and/or velocities associated with other body parts, poses, one-hot encodings of specific actions or motions (e.g., waving, throwing, picking up an object, gait, etc.), and/or other representations of pose or trajectory for the virtual character in one or more corresponding frames 402, 404, and/or 406.

In some embodiments, matching component 204 generates some or all attributes in feature vector 410 using a weighted combination of attributes from frames 402, 404, and 406. For example, matching component 204 could compute a root position, trajectory position, trajectory direction, one or more feet positions, and/or another attribute in feature vector 410 as a weighted sum of the same attributes associated with frames 402, 404, 406. Each weight used in the weighted sum could represent the importance of the corresponding frame to the attribute associated with the weighted sum. Thus, a given future frame 402, 404, or 406 could be associated with a higher weight if the future frame is temporally closer to the current frame, if the value of the attribute for the future frame is closer to the value of the attribute for the current frame, and/or if the attribute for the future frame is otherwise determined to be more "important" to the current frame. Conversely, a given future frame 402, 404, or 406 could be associated with a lower weight if the future frame is temporally more distant from the current frame, if the value of the attribute for the future frame is farther from the value of the attribute for the current frame, and/or if the attribute for the future frame is otherwise determined to be less "important" to the current frame.

After feature vector 410 is generated, matching component 204 generates match 416 by finding another feature vector 412 in database 210 that is the most similar to feature vector 410. For example, matching component 204 could generate match 416 between feature vector 410 and another feature vector 412 that minimizes the squared Euclidean distance to feature vector 410. Matching component 204 can also use a mapping between feature vector 412 and frame 408 in database 210 to update match 416 with frame 408 and/or a pose depicted in frame 408.

Returning to the discussion of FIG. 2, after matching component 204 has generated a motion match between a feature vector for a portion of a training control signal and a feature vector for a frame in a training motion sequence, data-generation component 202 generates training data that pairs that portion of the training control signal to one or more training frames 252 from the training motion sequence, starting with the frame matched to the feature vector for the portion of the training signal. For example, data-generation component 202 could pair a certain number of time steps spanned by the portion of the training signal with a corresponding number of consecutive frames from the training motion sequence, starting with the frame matched to the feature vector for the portion of the training signal.

Data-generation component 202 also uses training frames 252 paired with previous portions of training control signals 250 to generate feature vectors 248 for subsequent portions of the same training control signals 250. In turn, matching component 204 uses these feature vectors 248 to generate additional motion matches 254 between the subsequent portions of training control signals 250 and frames in training motion sequences 244.

More specifically, data-generation component 202 can initialize training frames 252 for a given training control signal with one or more starting frames depicting a virtual character in a rest pose (e.g., rest pose 314) and/or another starting pose. Data-generation component 202 can generate a first feature vector for the starting portion of the training control signal by combining the starting portion of the training control signal with the starting pose in the starting frames. Matching component 204 can generate a motion match between the first feature vector and a second feature vector in database 210, and data-generation component 204 can use the second feature vector in the motion match to retrieve the corresponding frame in a training motion sequence from database 210. Data-generation component 204 can also pair a number of time steps in the starting portion of the training control signal with a corresponding number of training frames 252 from the training motion sequence, starting with the frame that is mapped to the second feature vector within database 210. Data-generation component 202 and matching component 204 can repeat the process for each subsequent portion of the training control signal using one or more of the most recent training frames 252 paired with the training control signal and the subsequent portion of the training control signal. Consequently, data-generation component 202 and matching component 204 can generate a sequence of training frames 252 that follows a path, direction, velocity, action, or another motion-based attribute specified in a training control signal over a series of time steps by iteratively generating feature vectors 248 representing various points in the training control signal and previous poses in training frames 252 and using the generated feature vectors 248 to retrieve additional training frames 252 that most closely match the attributes in the generated feature vectors 248.

When matching component 204 generates motion matches 254 that cause training frames 252 for a given training control signal to switch from a first training motion sequence in the set of training motion sequences 244 to a second training motion sequence in the set of training motion sequences 244, matching component 204 generates one or more transition frames 256 between the first motion sequence and the second training motion sequence. For example, matching component 204 could use a cross-fade blend technique, inertialization technique, and/or another technique to generate transition frames 256 that remove the motion discontinuity between the last training frame from the first motion sequence and the first training frame from the second motion sequence. Matching component 204 and/or data-generation component 202 could then include the generated transition frames 256 in one or more training frames 252 between the last training frame from the first motion sequence and the first training frame from the second motion sequence.

Update component 206 trains machine learning model 208 using pairs of training control signals 250 and sequences of training frames 252 generated by data-generation component 202 and matching component 204. More specifically, update component 206 inputs a sequence of temporal windows from each of training control signals 250 into machine learning model 208. For one or more time steps associated with each temporal window, update component 206 obtains corresponding training output 222 that represents one or more poses for the virtual character at the time step(s). Update component 206 computes one or more losses 224 between training output 222 and one or more training frames 252 paired with the time step(s) from data-generation component 202. Update component 206 then uses a training technique (e.g., gradient descent and backpropagation) to update model parameters 220 of machine learning model 208 in a way that reduces losses 224. Update component 206 repeats the process with additional temporal windows of training control signals 250 and the corresponding training frames 252 until training of machine learning model 208 is complete.

While the operation of training engine 122 has been described above with respect to matching feature vectors 248 for training control signals 250 with feature vectors 246 for training motion sequences 244, it will be appreciated that training engine 122 can generate motion matches 254 between training control signals 250 and training frames 252 in other ways. For example, training engine 122 could use an inverse optimization technique to determine one or more training control signals 250 that match one or more training motion sequences 244, in lieu of or in addition to using feature vectors 246 and 248 to match training control signals 250 with corresponding portions of training motion sequences 244.

In another example, training engine 122 could use a data augmentation technique to generate one or more training control signals 250 by sampling random directions, velocities, and/or other attributes included in training control signals 250 from corresponding distributions of the attributes. These distributions of attributes could be manually set (e.g., to uniform distributions and/or other types of distributions) and/or determined using real-world examples (e.g., recordings of human users controlling input devices). This data augmentation technique could also use nearest neighbor search and/or interpolation of training motion sequences 244 to generate sequences of training frames 252 that match the generated training control signals 250. Because the data augmentation technique can be used to synthesize new training control signals 250 and new sequences of training frames 252 that match training control signals 250, machine learning model 208 can be trained to generate motions that differ from motions in training motion sequences 244, such as (but not limited to) sharper turns than those depicted in training motion sequences 244.

After training of machine learning model 208 is complete, execution engine 124 uses the trained machine learning model 208 to generate additional animations of a virtual character. For example, execution engine 124 could use machine learning model 208 to generate an animation for any virtual character with the same skeleton and/or arrangement of joints as the virtual character with which machine learning model 208 was trained. In another example, execution engine 124 could use machine learning model 208 to generate an animation for any virtual character with a skeleton that can be mapped to the skeleton of the virtual character with which machine learning model 208 was trained.

As shown in FIG. 2, execution engine 124 inputs control signal 212 into machine learning model 208 and uses machine learning model 208 to generate poses 216 that cause the virtual character follow the velocity, trajectory, strafing, actions, and/or other motion-based attributes represented by control signal 212. As poses 216 are generated by machine learning model 208, execution engine 124 updates context 214 to include one or more previous poses 216 and provides context 214 as additional input into machine learning model 208. As a result, each pose generated by machine learning model 208 can be conditioned on future motions specified in control signal 212 and previously generated poses 216 included in context 214.

Execution engine 124 also uses poses 216 outputted by machine learning model 208 to generate a motion sequence 218 for the virtual character. For example, execution engine 124 could cause the virtual character to perform motion sequence 218 by periodically and/or continuously updating a 2D model, 3D model, rendering, and/or another representation of the virtual character with poses 216 outputted by machine learning model 208.

In one or more embodiments, poses 216 outputted by machine learning model are used to generate animations, virtual characters, and/or other content in an immersive environment, such as (but not limited to) a VR, AR, and/or MR environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

Figure 5:
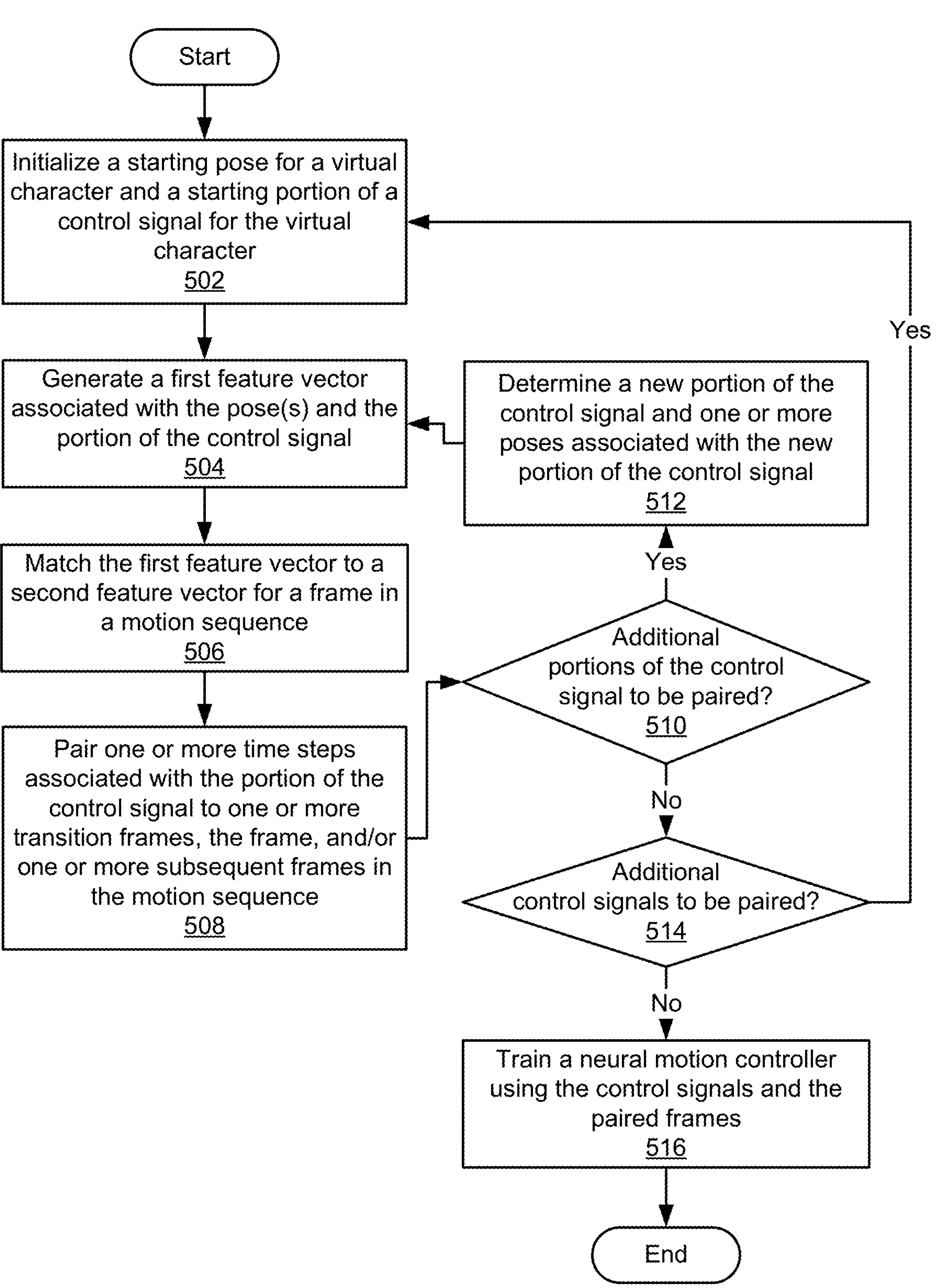
FIG. 5 is a flow diagram of method steps generating a neural motion controller, according to various embodiments.

FIG. 5 is a flow diagram of method steps generating a neural motion controller, according to various embodiments. Although the method steps are described in conjunction with the systems of FIGS. 1-2, persons skilled in the art will understand that any system configured to perform the method steps in any order falls within the scope of the present disclosure.

As shown, in step 502, training engine 122 initializes a starting pose for a virtual character and a starting portion of a control signal for the virtual character. For example, training engine 122 could set the starting pose to a rest pose and/or default pose for the virtual character. Training engine 122 could also set the starting portion of the control signal to span a temporal window and/or a certain number of time steps.

In step 504, training engine 122 generates a first feature vector associated with the pose and the portion of the control signal. For example, training engine 122 could populate the feature vector with one or more joint positions in the starting pose and/or one or more future time steps, a trajectory position associated with the starting pose and/or future time step(s), a trajectory direction associated with the future time step(s), and/or a root velocity derived from the control signal.

In step 506, training engine 122 matches the first feature vector to a second feature vector for a frame in a motion sequence. For example, training engine 122 could use the first feature vector to perform a lookup of a database of feature vectors mapped to individual frames in multiple motion sequences. Training engine 122 could retrieve, as a result of the lookup, a second feature vector from the database that is closest to the first feature vector in a multidimensional vector space. Training engine 122 could also use the mapping between the second feature and the frame in the motion sequence within the database to retrieve the frame and/or one or more subsequent frames in the same motion sequence.

In step 508, training engine 122 pairs one or more time steps associated with the portion of the control signal to one or more transition frames, the frame, and/or one or more subsequent frames in the motion sequence. For example, training engine 122 could pair a sequence of time steps in or around the starting portion of the control signal with a corresponding sequence of frames in the motion sequence, starting with the frame represented by the second feature vector.

In step 510, training engine 122 determines whether or not additional portions of the control signal are to be paired. For example, training engine 122 could determine that additional portions of the control signal are to be paired if the control signal extends beyond the starting portion, one or more time steps in the control signal have not been paired with one or more corresponding frames, a change in the control signal exceeds a threshold, and/or another condition associated with the control signal is met. If no additional portions of the control signal are to be paired, training engine 122 does not perform additional processing or pairing of the control signal.

If additional portions of the control signal are to be paired, training engine 122 performs step 512, in which training engine 122 determines a new portion of the control signal and one or more poses associated with the new portion of the control signal. For example, training engine 122 could determine the new portion of the control signal as a temporal window or a certain number of time steps spanned by the control signal that follows the last time step paired to a frame in step 508. Training engine 122 could also associate the new portion of the control signal with a certain number of poses paired to the most recent time steps in the previous portion of the control signal.

Training engine 122 repeats steps 504-510 using the new portion of the control signal and the pose(s) associated with the new portion of the control signal. For example, training engine 122 could generate a new first feature vector for the new portion of the control signal and match the new first feature vector to a second feature vector for a frame in a motion sequence. If the frame is from a different motion sequence than the last frame assigned to the previous portion of the control signal, training engine 122 could pair one or more time steps at the start of the new portion of the control signal to one or more transition frames that remove the motion continuity between the last frame assigned to the previous portion of the control signal and the frame matched to the new first feature vector. Training engine 122 could then pair one or more subsequent time steps in the control signal to the frame matched to the new first feature vector and/or one or more subsequent frames in the same motion sequence.

When training engine 122 determines in step 510 that additional portions of the control signal are to be paired, training engine 122 also repeats step 512 to initialize the next portion of the control signal and one or more corresponding poses, and further repeats steps 504-508 to pair time steps associated with the next portion of the control signal to transition frames and/or matching frames in a motion sequence from the database. Training engine 122 thus continues pairing time steps in temporal order within the control signal with corresponding transition frames and/or motion sequence frames until training engine 122 determines in step 510 that no additional portions of the control signal are to be paired.

Training engine 122 then performs step 514 to determine whether or not additional control signals are to be paired. For example, training engine 122 could determine that additional control signals are to be paired if a training dataset of control signals includes one or more control signals that have not been paired.

For each control signal to be paired, training engine 122 performs step 502 to initialize pairing of the control signal. Training engine 122 also performs operations 504-512 one or more times to iteratively pair time steps in the control signal with corresponding frames based on motion matches between the corresponding feature vectors, thereby generating a sequence of frames representing an animation that is controlled by the control signal.

After training engine 122 determines that no additional control signals are to be paired, training engine 122 performs step 516, in which training engine 122 trains a neural motion controller using the control signals and the paired frames. For example, training engine 122 could input a sequence of temporal windows from each control signal into the neural motion controller. For one or more time steps associated with each temporal window inputted into the neural motion controller, training engine 122 could obtain training output that represents one or more corresponding poses for the virtual character. Training engine 122 could compute one or more losses between the training output and one or more frames paired with the time step(s). Training engine 122 could then use a training technique (e.g., gradient descent and backpropagation) to update model parameters of the neural motion controller in a way that reduces the loss(es). Training engine 122 could additionally repeat the process with additional temporal windows of control signals and the corresponding paired frames until one or more conditions are met. These condition(s) include (but are not limited to) convergence in the parameters of the neural motion controller, the lowering of the loss(es) to below a threshold, and/or a certain number of training steps, iterations, batches, and/or epochs.

After the neural motion controller is trained, execution engine 124 can use one or more components of the neural motion controller to generate additional animations. For example, execution engine 124 could obtain a user selection of a virtual character and/or a skeleton for a virtual character. The selected virtual character and/or skeleton can be the same as or different from the virtual character and/or skeleton used to train the neural motion controller. Execution engine 124 could also receive a control signal for controlling the motion or of the virtual character and/or skeleton. Execution engine 124 could input the control signal into the neural motion controller and use the neural motion controller to generate a sequence of poses that cause the virtual character to follow the motion specified in the control signal. Execution engine 124 could also render and/or visually depict the virtual character performing the sequence of poses, thereby generating an animation of the virtual character that is controlled by the control signal.

Sequences of poses and/or animations generated by the neural motion controller can additionally be used in a number of applications. For example, the neural motion controller could be trained and/or executed to convert a control signal that includes a set of sparse points on a human into a corresponding sequence of poses or motions in an animal. During training, sequences of sparse points in a control signal could be paired with sequences of animal motion based on measures of vector distance between feature vectors for the sparse points and feature vectors for the sequences of animal motion. In another example, the neural motion controller could be trained and/or executed to convert sparse handles associated with certain portions of a 3D pose into a full 3D pose that most closely matches the sparse handles.

In sum, the disclosed techniques train and execute a neural motion controller using input data that includes a control signal for a virtual character. For example, the control signal could be provided by an input device such as a joystick, keyboard, trackpad, and/or gamepad controller; a tracking device in an AR, VR, or MR system; or a sparse motion capture system. The control signal could be used to determine a trajectory of the virtual character, a velocity of the virtual character, a direction to be in which the virtual character should face, an action to be performed by the virtual character, and/or another indication of the motion or behavior of the virtual character.

A training dataset for the neural motion controller is generated by matching a first feature vector of features associated with a given portion of the control signal and one or more poses of the virtual character associated with the portion of the control signal applies to a second feature vector for a frame in a motion sequence (e.g., a motion capture sequence) that is included in a database of motion sequences. For example, each feature vector could include a current and/or future position, trajectory, or velocity associated with one or more locations or joints for the virtual character. The second feature vector could be identified as a feature vector in the database with the smallest vector distance to the first feature vector. After the second feature vector is identified, the training dataset is updated with to include pairings of one or more time steps associated with the portion of the control signal with one or more frames in the motion sequence, starting with the frame represented by the second feature vector. This matching process is repeated after a certain time interval in the control signal and/or when the control signal changes significantly. Consequently, a given control signal in the training dataset is matched to an animation that includes a concatenation of different "pieces" of motion sequences, where each piece is selected to best match the feature vector associated with a corresponding portion of the control signal. To reduce or remove motion discontinuity between two different motion sequences in the animation, a transition can be added between the last frame of the first motion sequence and the first frame of the second motion sequence.

The neural motion controller is then trained to generate a sequence of motions corresponding to an animation in the training dataset based on input that includes the corresponding control signal and a context that includes one or more recently generated frames in the animation. For example, the neural motion controller could be used to generate a pose for a current frame in the animation, given input that includes one or more previous frames in the animation and a temporal window spanned by the control signal around the current frame. A loss could be computed between the generated pose and a corresponding ground truth pose for the current frame from the training dataset, and the loss could be backpropagated across the parameters of the neural motion controller to reduce the error of the neural motion controller over time.

One technical advantage of the disclosed techniques relative to the prior art is that the neural motion controller is able to generalize to input data that is derived from input device control signals. Consequently, the neural motion controller can generate output motions with fewer artifacts and errors than conventional neural motion controllers that process different types of input data during training and inference. Another technical advantage of the disclosed techniques is that the disclosed techniques can be used to train and execute any type of neural motion controller. Accordingly, the disclosed techniques can be adapted to a variety of neural motion controller architectures, characteristics, and use cases. These technical advantages provide one or more technological improvements over prior art approaches.

1. In some embodiments, a computer-implemented method for training a neural motion controller comprises determining a first set of features associated with a first control signal for a virtual character; matching the first set of features to a first sequence of motions included in a plurality of sequences of motions; and training the neural motion controller based on one or more motions included in the first sequence of motions and the first control signal.

2. The computer-implemented method of clause 1, further comprising executing the trained neural motion controller to generate one or more additional motions based on a second set of features associated with a second control signal for the virtual character.

3. The computer-implemented method of any of clauses 1-2, further comprising: matching a second set of features associated with the first control signal to a second sequence of motions included in the plurality of sequences of motions; and training the neural motion controller to generate one or more additional motions included in the second sequence of motions based on the first control signal.

4. The computer-implemented method of any of clauses 1-3, further comprising training the neural motion controller to generate a transition between the one or more motions and the one or more additional motions.

5. The computer-implemented method of any of clauses 1-4, further comprising generating the second set of features based on a change in the first control signal that exceeds a threshold.

6. The computer-implemented method of any of clauses 1-5, wherein determining the first set of features comprises determining a velocity associated with the first control signal; and generating the first set of features for one or more future points in time based on the velocity and a current pose associated with the virtual character.

7. The computer-implemented method of any of clauses 1-6, wherein matching the first set of features to the first sequence of motions comprises computing the first set of features based on a weighted combination of multiple sets of features associated with the first control signal; and determining a match between the first set of features and a second set of features associated with the first sequence of motions.

8. The computer-implemented method of any of clauses 1-7, wherein training the neural motion controller comprises: inputting the first control signal into the neural motion controller; and training the neural motion controller based on a loss computed between one or more outputs generated by the neural motion controller from the first control signal and the one or more motions.

9. The computer-implemented method of any of clauses 1-8, wherein the first control signal is generated via an input device.

10. The computer-implemented method of any of clauses 1-9, wherein the first set of features comprises at least one of a root position, a position of a body part, a trajectory position, a trajectory direction, or a root velocity.

11. In some embodiments, one or more non-transitory computer-readable media store instructions that, when executed by one or more processors, cause the one or more processors to perform the steps of determining a first set of features associated with a first control signal for a virtual character; matching the first set of features to a first sequence of motions included in a plurality of sequences of motions; and training a neural motion controller to generate one or more motions included in the first sequence of motions based on the first control signal.

12. The one or more non-transitory computer-readable media of clause 11, wherein the instructions further cause the one or more processors to perform the step of executing the trained neural motion controller to generate one or more additional motions based on a second set of features associated with the virtual character.

13. The one or more non-transitory computer-readable media of any of clauses 11-12, wherein the instructions further cause the one or more processors to perform the steps of matching a second set of features associated with the first control signal to a second sequence of motions included in the plurality of sequences of motions; generating a transition between the one or more motions included in the first sequence of motions and one or more additional motions included in the second sequence of motions; and training the neural motion controller to generate the transition and the one or more additional motions based on the first control signal.

14. The one or more non-transitory computer-readable media of any of clauses 11-13, wherein the instructions further cause the one or more processors to perform the steps of: generating the first set of features for a first set of frames associated with a first point in time within the first control signal; determining a second point in time within the first control signal that is a predetermined interval after the first point in time; and generating the second set of features for a second set of frames associated with the second point in time.

15. The one or more non-transitory computer-readable media of any of clauses 11-14, wherein determining the first set of features comprises: determining a motion-based attribute associated with the first control signal; and generating the first set of features for one or more future points in time based on the motion-based attribute and a current pose associated with the virtual character.

16. The one or more non-transitory computer-readable media of any of clauses 11-15, wherein matching the first set of features to the first sequence of motions comprises determining a distance between the first set of features and a second set of features associated with a first motion included in the first sequence of motions.

17. The one or more non-transitory computer-readable media of any of clauses 11-16, wherein the first control signal is generated via a motion tracking device.

18. The one or more non-transitory computer-readable media of any of clauses 11-17, wherein the first sequence of motions comprises one or more motion capture frames.

19. The one or more non-transitory computer-readable media of any of clauses 11-18, wherein the one or more motions comprise one or more rotations associated with a root pose for the virtual character.

20. In some embodiments, a system comprises one or more memories that store instructions, and one or more processors that are coupled to the one or more memories and, when executing the instructions, are configured to perform the steps of determining a first set of features associated with a first control signal for a virtual character; matching the first set of features to a first sequence of motions included in a plurality of sequences of motions; and training a neural motion controller to generate one or more motions included in the first sequence of motions based on the first control signal.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a neural motion controller, the method comprising:

determining a first set of features associated with a first control signal for a virtual character, the first control signal generated via an input device, wherein the determining comprises computing the first set of features based on a weighted combination of multiple sets of features associated with the first control signal;

matching the first set of features to a first sequence of motions included in a plurality of sequences of motions, wherein the matching comprises determining a match between the first set of features and a second set of features associated with the first sequence of motions; and training the neural motion controller based on one or more motions included in the first sequence of motions and the first control signal.

2. The computer-implemented method of claim 1, further comprising executing the trained neural motion controller to generate one or more additional motions based on a second set of features associated with a second control signal for the virtual character.

3. The computer-implemented method of claim 1, further comprising:

matching a second set of features associated with the first control signal to a second sequence of motions included in the plurality of sequences of motions; and training the neural motion controller to generate one or more additional motions included in the second sequence of motions based on the first control signal.

4. The computer-implemented method of claim 3, further comprising training the neural motion controller to generate a transition between the one or more motions and the one or more additional motions.

5. The computer-implemented method of claim 3, further comprising generating the second set of features based on a change in the first control signal that exceeds a threshold.

6. The computer-implemented method of claim 1, wherein determining the first set of features comprises:

determining a velocity associated with the first control signal; and generating the first set of features for one or more future points in time based on the velocity and a current pose associated with the virtual character.

7. The computer-implemented method of claim 1, wherein training the neural motion controller comprises:

inputting the first control signal into the neural motion controller; and training the neural motion controller based on a loss computed between one or more outputs generated by the neural motion controller from the first control signal and the one or more motions.

8. The computer-implemented method of claim 1, wherein the first set of features comprises at least one of a root position, a position of a body part, a trajectory position, a trajectory direction, or a root velocity.

9. One or more non-transitory computer-readable media storing instructions that, when executed by one or more processors, cause the one or more processors to perform the steps of:

determining a first set of features associated with a first control signal for a virtual character, the first control signal generated via an input device;

matching the first set of features to a first sequence of motions included in a plurality of sequences of motions, wherein the matching comprises determining a distance between the first set of features and a second set of features associated with a first motion included in the first sequence of motions; and training a neural motion controller to generate one or more motions included in the first sequence of motions based on the first control signal.

10. The one or more non-transitory computer-readable media of claim 9, wherein the instructions further cause the one or more processors to perform the step of executing the trained neural motion controller to generate one or more additional motions based on a second set of features associated with the virtual character.

11. The one or more non-transitory computer-readable media of claim 9, wherein the instructions further cause the one or more processors to perform the steps of:

matching a second set of features associated with the first control signal to a second sequence of motions included in the plurality of sequences of motions;

generating a transition between the one or more motions included in the first sequence of motions and one or more additional motions included in the second sequence of motions; and training the neural motion controller to generate the transition and the one or more additional motions based on the first control signal.

12. The one or more non-transitory computer-readable media of claim 11, wherein the instructions further cause the one or more processors to perform the steps of:

generating the first set of features for a first set of frames associated with a first point in time within the first control signal;

determining a second point in time within the first control signal that is a predetermined interval after the first point in time; and generating the second set of features for a second set of frames associated with the second point in time.

13. The one or more non-transitory computer-readable media of claim 9, wherein determining the first set of features comprises:

determining a motion-based attribute associated with the first control signal; and generating the first set of features for one or more future points in time based on the motion-based attribute and a current pose associated with the virtual character.

14. The one or more non-transitory computer-readable media of claim 9, wherein the input device is a motion tracking device.

15. The one or more non-transitory computer-readable media of claim 9, wherein the first sequence of motions comprises one or more motion capture frames.

16. The one or more non-transitory computer-readable media of claim 9, wherein the one or more motions comprise one or more rotations associated with a root pose for the virtual character.

17. A system, comprising:

one or more memories that store instructions, and one or more processors that are coupled to the one or more memories and, when executing the instructions, are configured to perform the steps of:

determining a first set of features associated with a first control signal for a virtual character, the first control signal generated via an input device;

matching the first set of features to a first sequence of motions included in a plurality of sequences of motions, wherein the matching comprises determining a distance between the first set of features and a second set of features associated with a first motion included in the first sequence of motions; and training a neural motion controller to generate one or more motions included in the first sequence of motions based on the first control signal.

* * * * *